United States Patent
Belser et al.

(10) Patent No.: US 6,549,699 B2
(45) Date of Patent: Apr. 15, 2003

(54) RECONFIGURABLE ALL-OPTICAL MULTIPLEXERS WITH SIMULTANEOUS ADD-DROP CAPABILITY

(75) Inventors: Karl Arnold Belser, San Jose, CA (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 10/060,493

(22) Filed: Jan. 29, 2002

(65) Prior Publication Data

US 2002/0131690 A1 Sep. 19, 2002

Related U.S. Application Data

(63) Continuation-in-part of application No. 09/938,426, filed on Aug. 23, 2001.
(60) Provisional application No. 60/277,217, filed on Mar. 19, 2001.

(51) Int. Cl.[7] .................................................. G02B 6/34
(52) U.S. Cl. .............................. 385/24; 385/37; 385/34; 385/47
(58) Field of Search .............................. 385/24, 37, 34, 385/33, 47

(56) References Cited

U.S. PATENT DOCUMENTS

| | | |
|---|---|---|
| 5,629,790 A | 5/1997 | Neukermans et al. |
| 5,960,133 A | 9/1999 | Tomlinson |
| 5,974,207 A | 10/1999 | Aksyuk et al. |
| 6,204,946 B1 | 3/2001 | Aksyuk et al. |
| 6,205,269 B1 | 3/2001 | Morton |
| 6,263,135 B1 * | 7/2001 | Wade ........................... 385/37 |
| 6,289,155 B1 * | 9/2001 | Wade ........................... 385/37 |
| 6,345,133 B1 * | 2/2002 | Morozov ....................... 385/24 |
| 6,381,387 B1 * | 4/2002 | Wendland, Jr. .............. 385/37 |
| 6,415,073 B1 * | 7/2002 | Cappiello et al. ............. 385/24 |
| 6,418,250 B1 | 7/2002 | Corbosiero et al. |
| 6,439,728 B1 * | 8/2002 | Copeland ..................... 359/515 |
| 6,453,087 B2 * | 9/2002 | Frish et al. ................... 385/24 |

\* cited by examiner

*Primary Examiner*—Hung N. Ngo
(74) *Attorney, Agent, or Firm*—Gray, Cary, Ware & Freidenrich

(57) ABSTRACT

This invention provides a novel wavelength-separating-routing (WSR) apparatus that uses a diffraction grating to separate a multi-wavelength optical signal by wavelength into multiple spectral channels, which are then focused onto an array of corresponding channel micromirrors. The channel micromirrors are individually controllable and continuously pivotable to reflect the spectral channels into multiple output ports. As such, the inventive WSR apparatus is capable of routing the spectral channels on a channel-by-channel basis and coupling any spectral channel into any one of the output ports. The WSR apparatus of the present invention may be further equipped with servo-control and spectral power-management capabilities, thereby maintaining the coupling efficiencies of the spectral channels into the output ports at desired values. The WSR apparatus of the present invention can be used to construct a novel class of dynamically reconfigurable optical add-drop multiplexers (OADMs) for WDM optical networking applications.

35 Claims, 15 Drawing Sheets

RECONFIGURABLE ALL-OPTICAL MULTIPLEXERS WITH SIMULTANEOUS ADD-DROP CAPABILITY

CROSS-REFERENCE TO RELATED APPLICATIONS

This application is a Continuation-in-part of U.S. patent application Ser. No. 09/938,426, filed on Aug. 23, 2001, which is incorporated herein by reference in its entirety, and which claims priority from U.S. Provisional Patent Application No. 60/277,217, filed on Mar. 19, 2001.

FIELD OF THE INVENTION

This invention relates generally to optical communication systems. More specifically, it relates to a novel class of dynamically reconfigurable optical add-drop multiplexers (OADMs) for wavelength division multiplexed optical networking applications.

BACKGROUND

As fiber-optic communication networks rapidly spread into every walk of modern life, there is a growing demand for optical components and subsystems that enable the fiber-optic communications networks to be increasingly scalable, versatile, robust, and cost-effective.

Contemporary fiber-optic communications networks commonly employ wavelength division multiplexing (WDM), for it allows multiple information (or data) channels to be simultaneously transmitted on a single optical fiber by using different wavelengths and thereby significantly enhances the information bandwidth of the fiber. The prevalence of WDM technology has made optical add-drop multiplexers indispensable building blocks of modern fiber-optic communication networks. An optical add-drop multiplexer (OADM) serves to selectively remove (or drop) one or more wavelengths from a multiplicity of wavelengths on an optical fiber, hence taking away one or more data channels from the traffic stream on the fiber. It further adds one or more wavelengths back onto the fiber, thereby inserting new data channels in the same stream of traffic. As such, an OADM makes it possible to launch and retrieve multiple data channels onto and from an optical fiber respectively, without disrupting the overall traffic flow along the fiber. Indeed, careful placement of the OADMs can dramatically improve an optical communication network's flexibility and robustness, while providing significant cost advantages.

Conventional OADMs in the art typically employ multiplexers/demultiplexers (e.g, waveguide grating routers or arrayed-waveguide gratings), tunable filters, optical switches, and optical circulators in a parallel or serial architecture to accomplish the add and drop functions. In the parallel architecture, as exemplified in U.S. Pat. No. 5,974,207, a demultiplexer (e.g., a waveguide grating router) first separates a multi-wavelength signal into its constituent spectral components. A wavelength switching/routing means (e.g., a combination of optical switches and optical circulators) then serves to drop selective wavelengths and add others. Finally, a multiplexer combines the remaining (i.e., the pass-through) wavelengths into an output multi-wavelength optical signal. In the serial architecture, as exemplified in U.S. Pat. No. 6,205,269, tunable filters (e.g., Bragg fiber gratings) in combination with optical circulators are used to separate the drop wavelengths from the pass-through wavelengths and subsequently launch the add channels into the pass-through path. And if multiple wavelengths are to be added and dropped, additional multiplexers and demultiplexers are required to demultiplex the drop wavelengths and multiplex the add wavelengths, respectively. Irrespective of the underlying architecture, the OADMs currently in the art are characteristically high in cost, and prone to significant optical loss accumulation. Moreover, the designs of these OADMs are such that it is inherently difficult to reconfigure them in a dynamic fashion.

U.S. Pat. No. 6,204,946 to Askyuk et al. discloses an OADM that makes use of free-space optics in a parallel construction. In this case, a multi-wavelength optical signal emerging from an input port is incident onto a ruled diffraction grating. The constituent spectral channels thus separated are then focused by a focusing lens onto a linear array of binary micromachined mirrors. Each micromirror is configured to operate between two discrete states, such that it either retroreflects its corresponding spectral channel back into the input port as a pass-through channel, or directs its spectral channel to an output port as a drop channel. As such, the pass-through signal (i.e., the combined pass-through channels) shares the same input port as the input signal. An optical circulator is therefore coupled to the input port, to provide necessary routing of these two signals. Likewise, the drop channels share the output port with the add channels. An additional optical circulator is thereby coupled to the output port, from which the drop channels exit and the add channels are introduced into the output port. The add channels are subsequently combined with the pass-through signal by way of the diffraction grating and the binary micromirrors.

Although the aforementioned OADM disclosed by Askyuk et al. has the advantage of performing wavelength separating and routing in free space and thereby incurring less optical loss, it suffers a number of limitations. First, it requires that the pass-through signal share the same port/fiber as the input signal. An optical circulator therefore has to be implemented, to provide necessary routing of these two signals. Likewise, all the add and drop channels enter and leave the OADM through the same output port, hence the need for another optical circulator. Moreover, additional means must be provided to multiplex the add channels before entering the system and to demultiplex the drop channels after exiting the system. This additional multiplexing/demultiplexing requirement adds more cost and complexity that can restrict the versatility of the OADM thus-constructed. Second, the optical circulators implemented in this OADM for various routing purposes introduce additional optical losses, which can accumulate to a substantial amount. Third, the constituent optical components must be in a precise alignment, in order for the system to achieve its intended purpose. There are, however, no provisions provided for maintaining the requisite alignment; and no mechanisms implemented for overcoming degradation in the alignment owing to environmental effects such as thermal and mechanical disturbances over the course of operation.

U.S. Pat. No. 5,960,133 to Tomlinson discloses an OADM that makes use of a design similar to that of Aksyuk et al. In one embodiment, there are input, output, drop and add beams arranged in a rectangular array. Each micromirror, being switchable between two discrete positions, either reflects its corresponding wavelength component from the input beam back to the output beam, or concomitantly reflects the wavelength component from the input beam back to the drop beam and the same wavelength component from the add beam back to the output beam.

Alternative embodiments are also shown, where multiple add and drop beams, along with input and output beams, are arranged in a two-dimensional array. However, as in the case of Askyuk et al., there are no provisions provided for maintaining requisite optical alignment in the system, and no mechanisms implemented for mitigating degradation in the alignment due to environmental effects over the course of operation. Moreover, it may be difficult in some applications to align multiple optical beams in a two-dimensional configuration and further maintain the requisite alignment.

As such, the prevailing drawbacks suffered by the OADMs currently in the art are summarized as follows:

1) The wavelength routing is intrinsically static, rendering it difficult to dynamically reconfigure these OADMs.
2) Add and/or drop channels often need to be multiplexed and/or demultiplexed, thereby imposing additional complexity and cost.
3) Stringent fabrication tolerance and painstaking optical alignment are required. Moreover, the optical alignment is not actively maintained, rendering it susceptible to environmental effects such as thermal and mechanical disturbances over the course of operation.
4) In an optical communication network, OADMs are typically in a ring or cascaded configuration. In order to mitigate the interference amongst OADMs, which often adversely affects the overall performance of the network, it is essential that the optical power levels of spectral channels entering and exiting each OADM be managed in a systematic way, for instance, by introducing power (or gain) equalization at each stage. Such a power equalization capability is also needed for compensating for nonuniform gain caused by optical amplifiers (e.g., erbium doped fiber amplifiers) in the network. There lacks, however, a systematic and dynamic management of the optical power levels of various spectral channels in these OADMs.
5) The inherent high cost and heavy optical loss further impede the wide application of these OADMs.

In view of the foregoing, there is an urgent need in the art for optical add-drop multiplexers that overcome the aforementioned shortcomings in a simple, effective, and economical construction.

SUMMARY OF THE INVENTION

The present invention provides a wavelength-separating-routing (WSR) apparatus and method which employ an array of fiber collimators serving as an input port and a plurality of output ports; a wavelength-separator; a beam-focuser; and an array of channel micromirrors.

In operation, a multi-wavelength optical signal emerges from the input port. The wavelength separator separates the multi-wavelength optical signal into multiple spectral channels, each characterized by a distinct center wavelength and associated bandwidth. The beam-focuser focuses the spectral channels into corresponding focused spots. The channel micromirrors are positioned such that each channel micromirror receives one of the spectral channels. The channel micromirrors are individually controllable and movable, e.g., continuously pivotable (or rotatable), so as to reflect the spectral channels into selected ones of the output ports. As such, each channel micromirror is assigned to a specific spectral channel, hence the name "channel micromirror". Each output port may receive any number of the reflected spectral channels.

A distinct feature of the channel micromirrors in the present invention, in contrast to those used in the prior art, is that the pivoting (or rotational) motion of each channel micromirror is under analog control such that its pivoting angle can be continuously adjusted. This enables each channel micromirror to scan its corresponding spectral channel across all possible output ports and thereby direct the spectral channel to any desired output port.

In the WSR apparatus of the present invention, the wavelength-separator may be provided by a ruled diffraction grating, a holographic diffraction grating, an echelle grating, a curved diffraction grating, a transmission grating, a dispersing prism, or other types of wavelength-separating means known in the art. The beam-focuser may be a single lens, an assembly of lenses, or other types of beam-focusing means known in the art. The channel micromirrors may be provided by silicon micromachined mirrors, reflective ribbons (or membranes), or other types of beam-deflecting means known in the art. Each channel micromirror may be pivotable about one or two axes. The fiber collimators serving as the input and output ports may be arranged in a one-dimensional or two-dimensional array. In the latter case, the channel micromirrors must be pivotable biaxially.

The WSR apparatus of the present invention may further comprise an array of collimator-alignment mirrors, in optical communication with the wavelength-separator and the fiber collimators, for adjusting the alignment of the input multi-wavelength signal and directing the reflected spectral channels into the selected output ports by way of angular control of the collimated beams. Each collimator-alignment mirror may be rotatable about one or two axes. The collimator-alignment mirrors may be arranged in a one-dimensional or two-dimensional array. First and second arrays of imaging lenses may additionally be optically interposed between the collimator-alignment mirrors and the fiber collimators in a telecentric arrangement, thereby "imaging" the collimator-alignment mirrors onto the corresponding fiber collimators to ensure an optimal alignment.

The WSR apparatus of the present invention may further include a servo-control assembly, in communication with the channel micromirrors and the output ports. The servo-control assembly serves to monitor the optical power levels of the spectral channels coupled into the output ports and further provide control of the channel micromirrors on an individual basis, so as to maintain a predetermined coupling efficiency for each spectral channel into an output port. (If the WSR apparatus includes an array of collimator-alignment mirrors as described above, the servo-control assembly may additionally provide dynamic control of the collimator-alignment mirrors.) As such, the servo-control assembly provides dynamic control of the coupling of the spectral channels into the respective output ports and actively manages the optical power levels of the spectral channels coupled into the output ports. For example, the optical power levels of the spectral channels coupled into the output ports can be equalized at a predetermined value. Moreover, the utilization of such a servo-control assembly effectively relaxes the fabrication tolerances and precision during assembly of a WSR apparatus of the present invention, and further enables the system to correct for shift in optical alignment that may arise over the course of operation. A WSR apparatus incorporating a servo-control assembly thus described is termed a WSR-S apparatus, in the following discussion.

Accordingly, the WSR-S (or WSR) apparatus of the present invention may be used to construct a variety of optical devices, including a novel class of dynamically reconfigurable optical add-drop multiplexers (OADMs).

In one embodiment of an OADM according to the present invention, a one-dimensional input-output-port array, including an input port, a pass-through port, a plurality of drop ports, and a plurality of add ports, may be implemented in a WSR of the present invention. The arrangement of the input-output-port array may be such that the input ports (i.e., the input port and the add ports) transmitting the incoming optical signals and the output ports (i.e., the pass-through and the drop ports) carrying the outgoing optical signal are positioned in an alternating (or interleaved) fashion, whereby interposed between every two input ports is an output port, and vice versa. Such an arrangement warrants that if a spectral channel originating from the input port is to be routed to a drop port, an add spectral channel with the same wavelength from an adjacent (or pairing) add port can be simultaneously directed into the pass-through port. This is due to the fact that the drop spectral channel and the corresponding add spectral channel are routed to their respective destinations by the same channel micromirror in the WSR apparatus.

In an alternative embodiment of an OADM according to the present invention, a two-dimensional input-output-port array may be implemented in a WSR apparatus of the present invention. The input-output-port array comprises an input-port column having an input port and a plurality of add ports, and an output-port column including a pass-through port and a plurality of drop ports. In this arrangement, each input port forms a "pair" with its adjacent output port, thereby enabling each channel micromirror to route a spectral channel from the input port to a drop port and simultaneously direct an add spectral channel (with the same wavelength) from a pairing add port to the pass-through port.

As such, a notable advantage of the aforementioned OADMs is the ability to add and drop multiple spectral channels in a dynamically reconfigurable fashion, without involving additional components such as optical circulators and/or optical combiners. A servo-control assembly may be further incorporated in an OADM of the present invention, for monitoring and controlling the optical power levels of the spectral channels coupled into the output ports.

The OADMs of the present invention provide many advantages over the prior devices, notably:

1) By advantageously employing an array of channel micromirrors that are individually and continuously controllable, an OADM of the present invention is capable of routing the spectral channels on a channel-by-channel basis and directing any spectral channel into any one of multiple output ports. As such, its underlying operation is dynamically reconfigurable, and its underlying architecture is intrinsically scalable to a large number of channel counts.

2) The add and drop spectral channels need not be multiplexed and demultiplexed before entering and after leaving the OADM respectively. And there are not fundamental restrictions on the wavelengths to be added or dropped.

3) The coupling of the spectral channels into the output ports is dynamically controlled by a servo-control assembly, rendering the OADM less susceptible to environmental effects (such as thermal and mechanical disturbances) and therefore more robust in performance. By maintaining an optimal optical alignment, the optical losses incurred by the spectral channels are also significantly reduced.

4) The optical power levels of the spectral channels coupled into the pass-through port can be dynamically managed according to demand, or maintained at desired values (e.g., equalized at a predetermined value) by way of the servo-control assembly. The optical power levels of the spectral channels coupled into the drop ports can also be monitored by the servo-control assembly. This spectral power-management capability as an integral part of the OADM will be particularly desirable in WDM optical networking applications.

5) The use of free-space optics provides a simple, low loss, and cost-effective construction. Moreover, the utilization of the servo-control assembly effectively relaxes the fabrication tolerances and precision during initial assembly, enabling the OADM to be simpler and more adaptable in structure, lower in cost and optical loss.

6) The underlying OADM architecture allows a multiplicity of the OADMs according to the present invention to be readily assembled (e.g., cascaded) for WDM optical networking applications.

The novel features of this invention, as well as the invention itself, will be best understood from the following drawings and detailed description.

DETAILED DESCRIPTION

In this specification and appending claims, a "spectral channel" is characterized by a distinct center wavelength and associated bandwidth. Each spectral channel may carry a unique information signal, as in WDM optical networking applications.

Figure 1A:
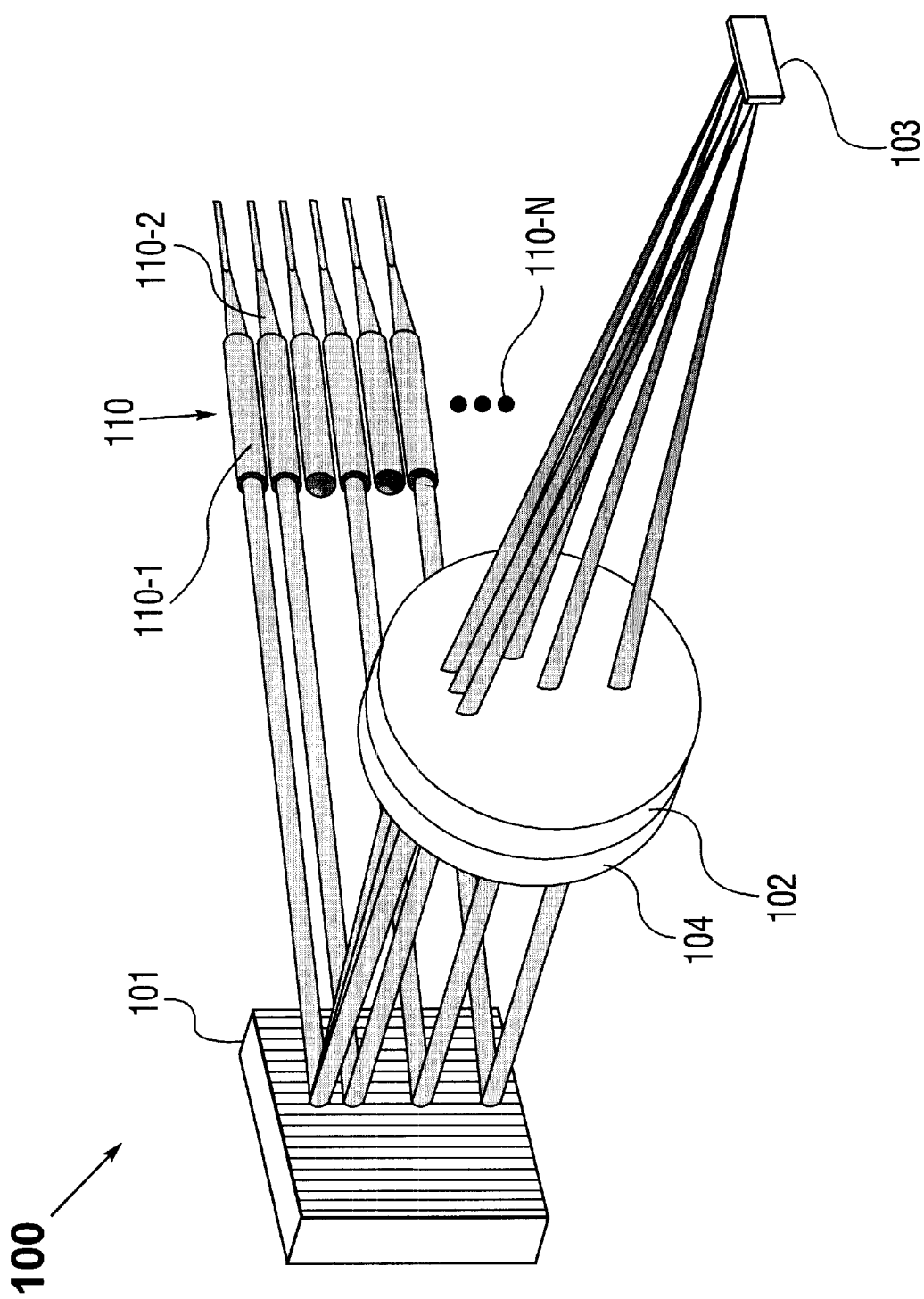
FIGS. 1A–1D show a first embodiment of a wavelength-separating-routing (WSR) apparatus according to the present invention, and the modeling results demonstrating the performance of the WSR apparatus.

FIG. 1A depicts a first embodiment of a wavelength-separating-routing (WSR) apparatus according to the present invention. By way of example to illustrate the general principles and the topological structure of a wavelength-separating-routing (WSR) apparatus of the present invention, the WSR apparatus 100 comprises multiple input/output ports which may be in the form of an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103.

In operation, a multi-wavelength optical signal emerges from the input port 110-1. The diffraction grating 101 angularly separates the multi-wavelength optical signal into multiple spectral channels, which are in turn focused by the focusing lens 102 into a spatial array of corresponding focused spots (not shown in FIG. 1A). The channel micromirrors 103 are positioned in accordance with the spatial array formed by the spectral channels, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror is assigned to a specific spectral channel, hence the name "channel micromirror". Each output port may receive any number of the reflected spectral channels.

For purposes of illustration and clarity, only a select few (e.g., three) of the spectral channels, along with the input multi-wavelength optical signal, are graphically illustrated in FIG. 1A and the following figures. It should be noted, however, that there can be any number of the spectral channels in a WSR apparatus of the present invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively in the first and second (i.e., the front and back) focal planes (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational walk-off effects that may otherwise arise. Moreover, the multi-wavelength input optical signal is preferably collimated and circular in cross-section. The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. For instance, the diffraction efficiency of a grating in a standard mounting configuration may be considerably higher for p (or TM) polarization (perpendicular to the groove lines on the grating) than for s (or TE) polarization (orthogonal to p-polarization), or vice versa. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if an optical beam has p-polarization when first encountering the diffraction grating, it would have predominantly (if not all) s-polarization upon the second encountering, and vice versa.) This ensures that all the spectral channels incur nearly the same amount of round-trip polarization dependent loss.

Figure 1B:
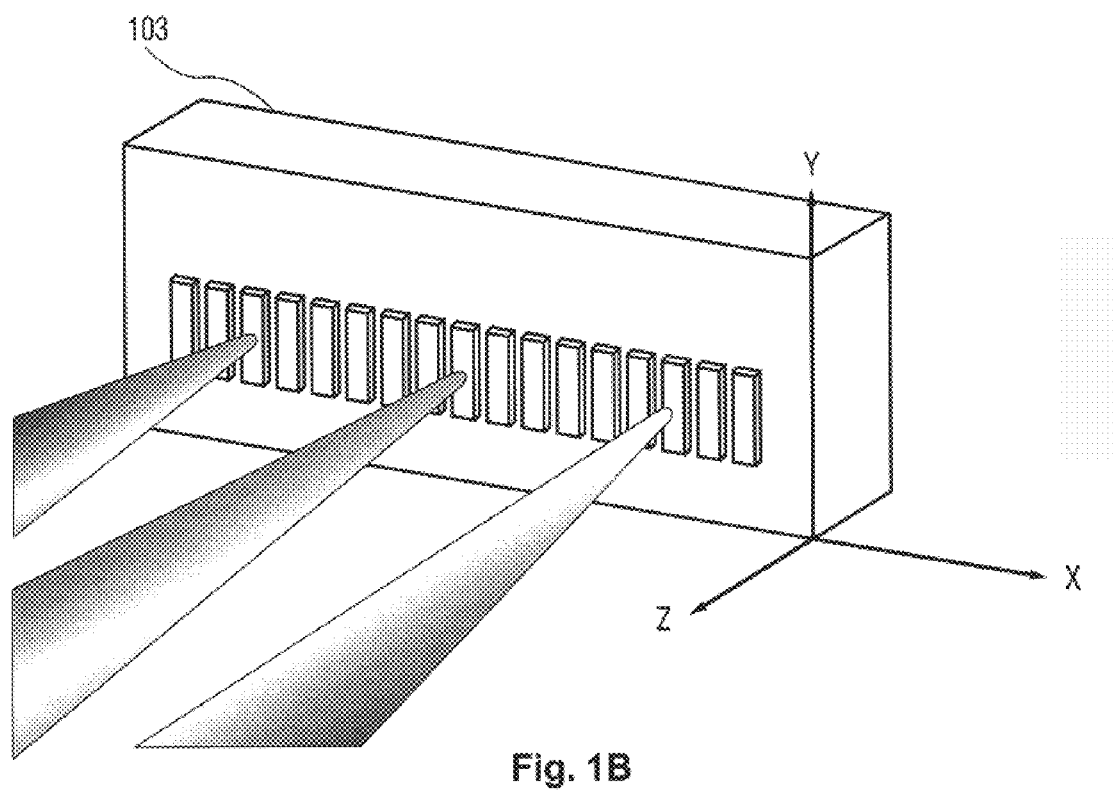

In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

Depicted in FIG. 1B is a close-up view of the channel micromirrors 103 shown in the embodiment of FIG. 1A. By way of example, the channel micromirrors 103 are arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) The reflective surface of each channel micromirror lies in the x–y plane as defined in the figure and be movable, e.g., pivotable (or deflectable) about an axis along the x-direction in an analog (or continuous) manner. Each spectral channel, upon reflection, is deflected in the y-direction (e.g., downward) relative to its incident direction, so as to be directed into one of the output ports 110-2 through 110-N shown in FIG. 1A.

Figure 1C:
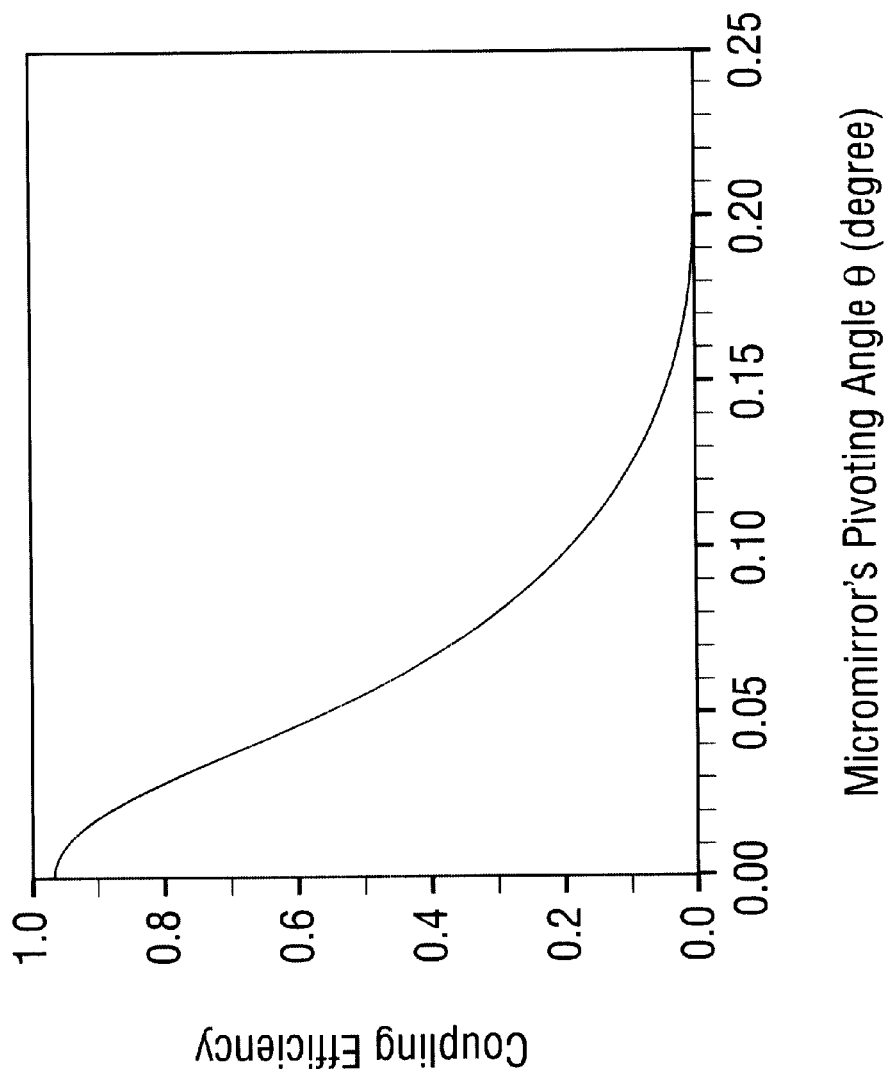
Figure 1D:
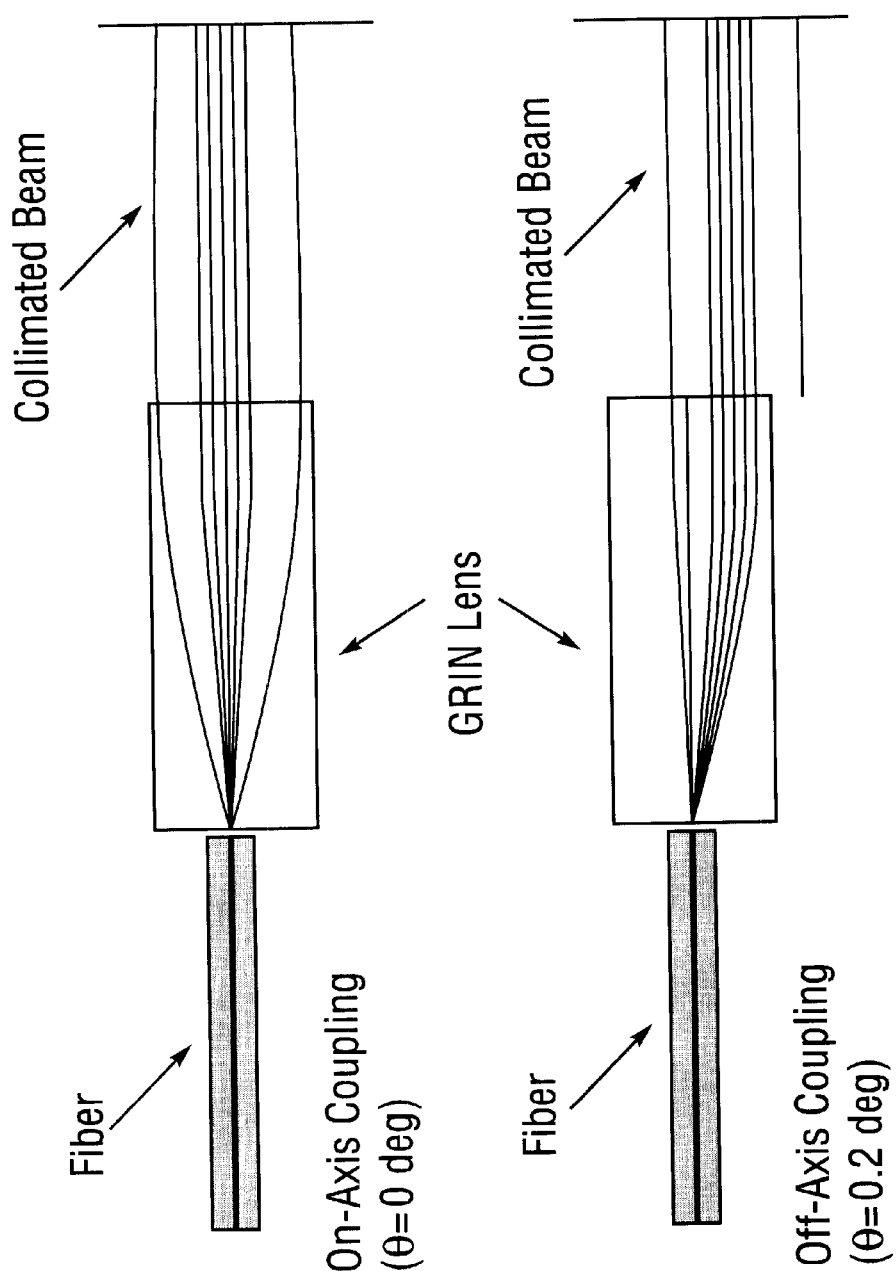

As described above, a unique feature of the present invention is that the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1C shows a plot of coupling efficiency as a function of a channel micromirror's pivoting angle θ, provided by a ray-tracing model of a WSR apparatus in the embodiment of FIG. 1A. As used herein, the coupling efficiency for a spectral channel is defined as the ratio of the amount of optical power coupled into the fiber core in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "−1" order. The focusing lens has a focal length of 100 mm. Each output port is provided by a quarter-pitch GRIN lens (2 mm in diameter) coupled to an optical fiber (see FIG. 1D). As displayed in FIG. 1C, the coupling efficiency varies with the pivoting angle θ, and it requires about a 0.2-degree change in θ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the present invention. FIG. 1D provides ray-tracing illustrations of two extreme points on the coupling efficiency vs. θ curve of FIG. 1C: on-axis coupling corresponding to θ=0, where the coupling efficiency is maximum; and off-axis coupling corresponding to θ=0.2 degrees, where the representative collimated beam (representing an exemplary spectral channel) undergoes a significant translational walk-off and renders the coupling efficiency practically negligible. The exemplary modeling results thus described demonstrate the unique capabilities of the WSR apparatus of the present invention.

FIG. 1A provides one of many embodiments of a WSR apparatus according to the present invention. In general, the wavelength-separator is a wavelength-separating means that may be a ruled diffraction grating, a holographic diffraction grating, an echelle grating, a dispersing prism, or other types of spectral-separating means known in the art. The beam-focuser may be a focusing lens, an assembly of lenses, or other beam-focusing means known in the art. The focusing function may also be accomplished by using a curved diffraction grating as the wavelength-separator. The channel micromirrors may be provided by silicon micromachined mirrors, reflective ribbons (or membranes), or other types of beam-deflecting elements known in the art. Each micromirror may be pivoted about one or two axes. It is important that the pivoting (or rotational) motion of each channel micromirror be individually controllable in an analog manner, whereby the pivoting angle can be continuously adjusted so as to enable the channel micromirror to scan a spectral channel across all possible output ports. The underlying fabrication techniques for micromachined mirrors and associated actuation mechanisms are well documented in the art, see U.S. Pat. No. 5,629,790 for example. Moreover, a fiber collimator is typically in the form of a collimating lens (such as a GRIN lens) and a ferrule-mounted fiber packaged together in a mechanically rigid stainless steel (or glass) tube. The fiber collimators serving as the input and output ports may be arranged in a one-dimensional array, a two-dimensional array, or other desired spatial pattern. For instance, they may be conveniently mounted in a linear array along a V-groove fabricated on a substrate made of silicon, plastic, or ceramic, as commonly practiced in the art. It should be noted, however, that the input port and the output ports need not necessarily be in close spatial proximity with each other, such as in an array configuration (although a close packing would reduce the rotational range required for each channel micromirror). Those skilled in the art will know how to design a WSR apparatus according to the present invention, to best suit a given application.

Figure 2A:
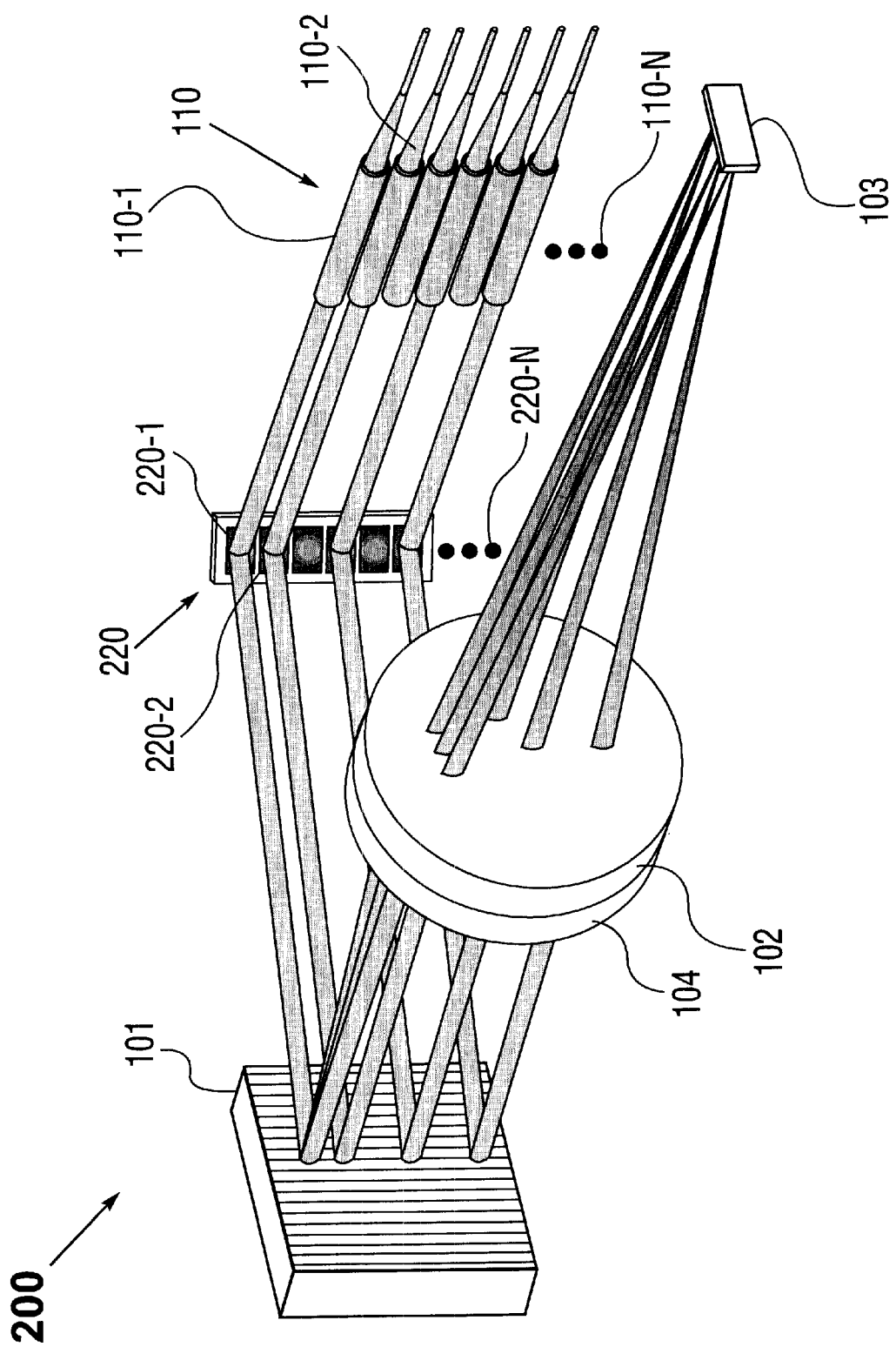
FIG. 2A depicts a second embodiment of a WSR apparatus according to the present invention.
Figure 2B:
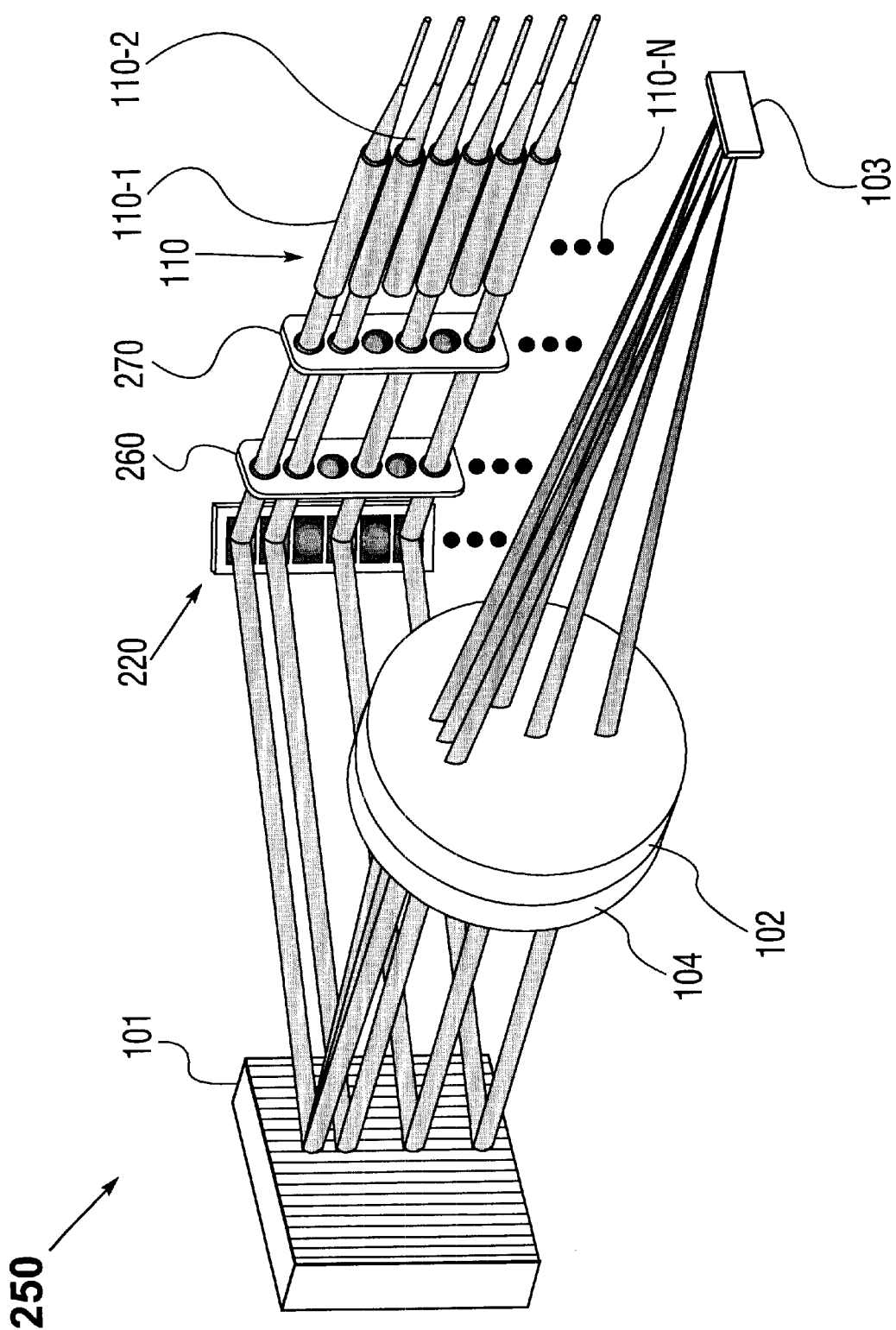
FIGS. 2B–2C show a third embodiment of a WSR apparatus according to the present invention.
Figure 3:
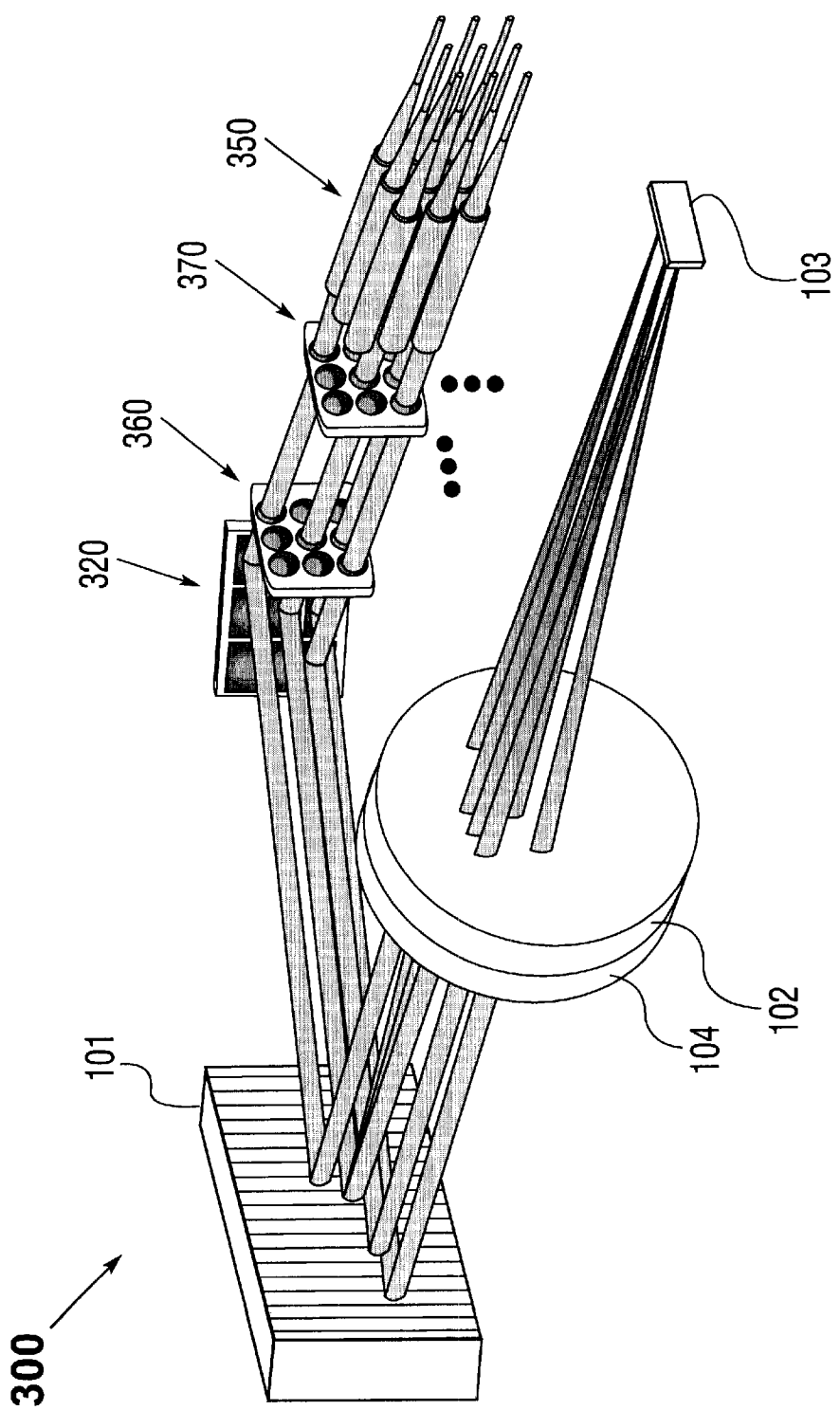
FIG. 3 depicts a fourth embodiment of a WSR apparatus according to the present invention.

A WSR apparatus of the present invention may further comprise an array of collimator-alignment mirrors, for adjusting the alignment of the input multi-wavelength optical signal and facilitating the coupling of the spectral channels into the respective output ports, as shown in FIGS. 2A–2B and 3.

Depicted in FIG. 2A is a second embodiment of a WSR apparatus according to the present invention. By way of example, WSR apparatus 200 is built upon and hence shares a number of the elements used in the embodiment of FIG. 1A, as identified by those elements labeled with identical numerals. Moreover, a one-dimensional array 220 of collimator-alignment mirrors 220-1 through 220-N is optically interposed between the diffraction grating 101 and the fiber collimator array 110. The collimator-alignment mirror 220-1 is designated to correspond with the input port 110-1, for adjusting the alignment of the multi-wavelength input optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes.

Figure 2C:
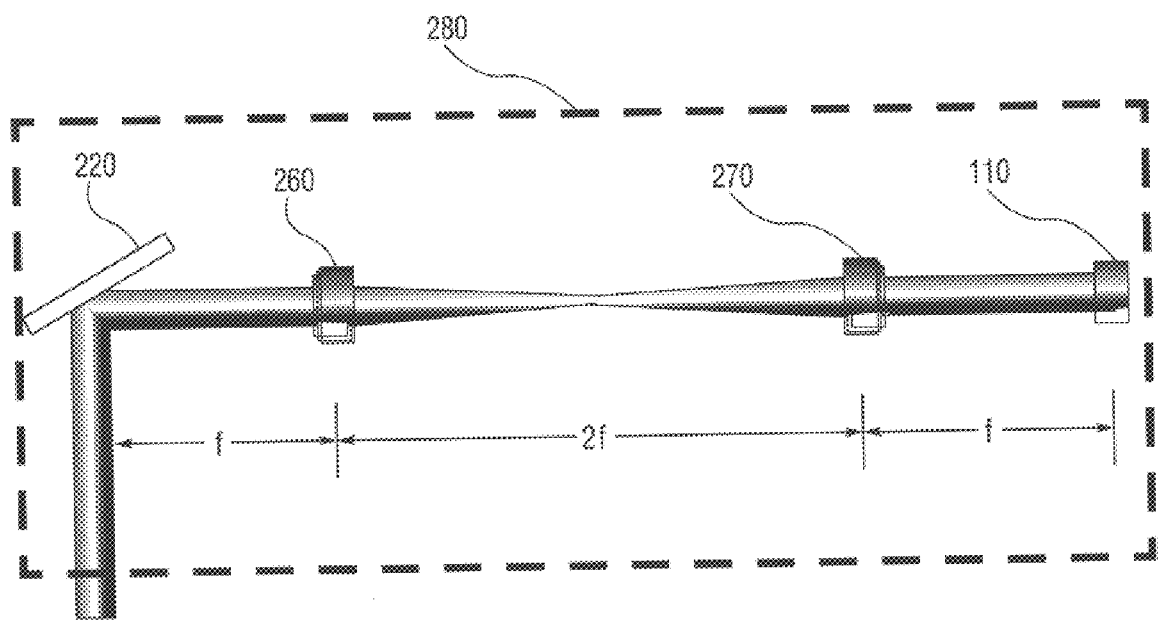

The embodiment of FIG. 2A is attractive in applications where the fiber collimators (serving as the input and output ports) are desired to be placed in close proximity to the collimator alignment mirror array 220. To best facilitate the coupling of the spectral channels into the output ports, imaging lenses may be implemented between the collimator-alignment mirror array 220 and the fiber collimator array 110, as depicted in FIG. 2B. By way of example, WSR apparatus 250 of FIG. 2B is built upon and hence shares many of the elements used in the embodiment of FIG. 2A, as identified by those elements labeled with identical numerals. Additionally, first and second arrays 260, 270 of imaging lenses are placed in a 4-f telecentric arrangement with respect to the collimator-alignment mirror array 220 and the fiber collimator array 110. The dashed box 280 shown in FIG. 2C provides a top view of such a telecentric arrangement. In this case, the imaging lenses in the first and second arrays 260, 270 all have the same focal length f. The collimator-alignment mirrors 220-1 through 220-N are placed at the respective first (or front) focal points of the imaging lenses in the first array 260. Likewise, the fiber collimators 110-1 through 110-N are placed at the respective second (or back) focal points of the imaging lenses in the second array 270. The separation between the first and second arrays 260, 270 of imaging lenses is 2 f. In this way, the collimator-alignment mirrors 220-1 through 220-N are effectively imaged onto the respective entrance surfaces (i.e., the front focal planes) of the GRIN lenses in the corresponding fiber collimators 110-1 through 110-N. Such a 4-f imaging system substantially eliminates translational walk-off of the collimated beams at the output ports that may otherwise occur as the mirror angles change.

FIG. 3 shows a fourth embodiment of a WSR apparatus according to the present invention. By way of example, WSR apparatus 300 is built upon and hence shares a number of the elements used in the embodiment of FIG. 2B, as identified by those elements labeled with identical numerals. In this case, the one-dimensional fiber collimator array 110 of FIG. 2B is replaced by a two-dimensional array 350 of fiber collimators, providing for an input-port and a plurality of output ports. Accordingly, the one-dimensional collimator-alignment mirror array 220 of FIG. 2B is replaced by a two-dimensional array 320 of collimator-alignment mirrors, and first and second one-dimensional arrays 260, 270 of imaging lenses of FIG. 2B are likewise replaced by first and second two-dimensional arrays 360, 370 of imagining lenses, respectively. As in the case of the embodiment of FIG. 2B, the first and second two-dimensional arrays 360, 370 of imaging lenses are placed in a 4-f telecentric arrangement with respect to the two-dimensional collimator-alignment mirror array 320 and the two-dimensional fiber collimator array 350. Each of the channel micromirrors 103 must be pivotable biaxially in this case, in order to direct its corresponding spectral channel to any one of the output ports. As such, the WSR apparatus 300 is equipped to support a greater number of output ports.

In addition to facilitating the coupling of the spectral channels into the respective output ports as described above, the collimator-alignment mirrors in the above embodiments also serve to compensate for misalignment (e.g., due to fabrication and assembly errors) in the fiber collimators that provide for the input and output ports. For instance, relative misalignment between the fiber cores and their respective collimating lenses in the fiber collimators can lead to pointing errors in the collimated beams, which may be corrected for by the collimator-alignment mirrors. For these reasons, the collimator-alignment mirrors are preferably rotatable about two axes. They may be silicon micromachined mirrors, for fast rotational speeds. They may also be other types of mirrors or beam-deflecting elements known in the art.

To optimize the coupling of the spectral channels into the output ports and further maintain the optimal optical alignment against environmental effects such as temperature variations and mechanical instabilities over the course of operation, a WSR apparatus of the present invention may incorporate a servo-control assembly, for providing dynamic control of the coupling of the spectral channels into the respective output ports on a channel-by-channel basis. A WSR apparatus incorporating a servo-control assembly is termed a WSR-S apparatus in this specification.

Figure 4A:
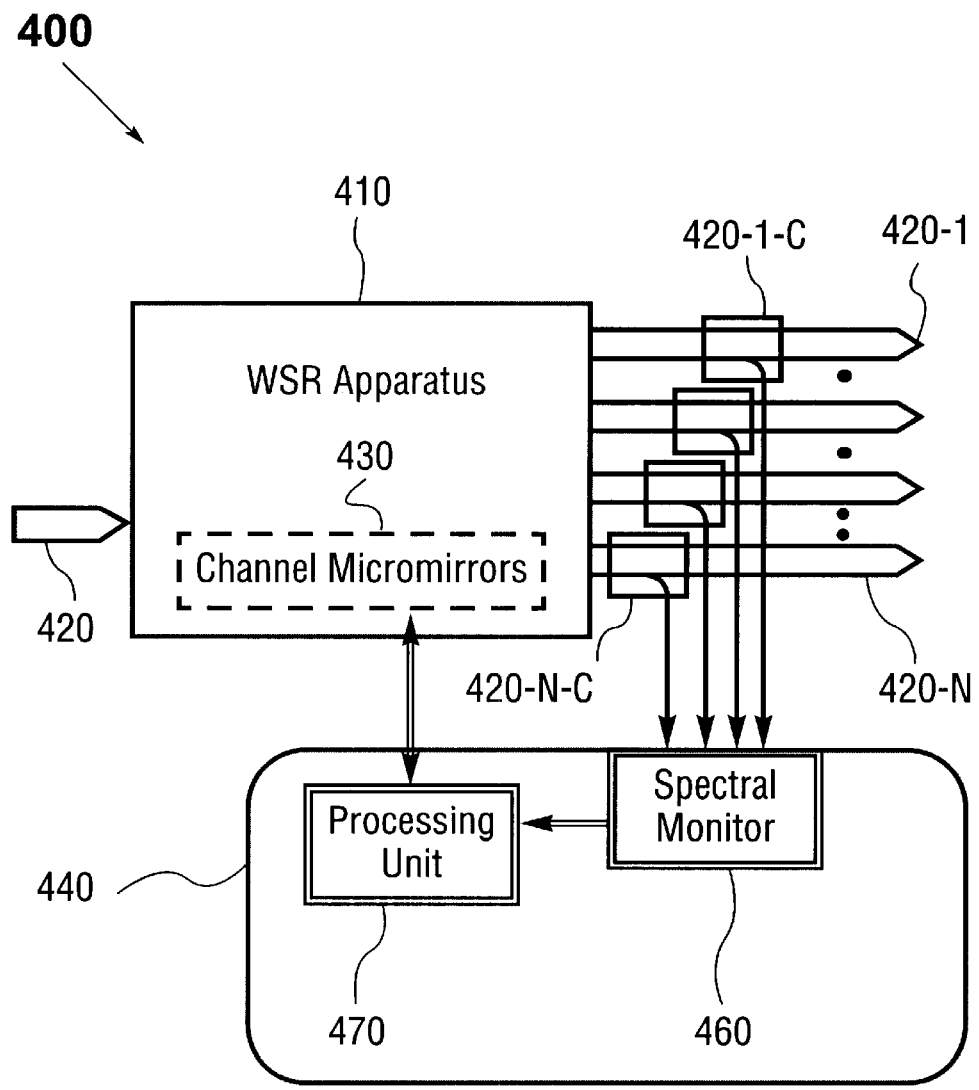
FIGS. 4A–4B show schematic illustrations of two embodiments of a WSR-S apparatus comprising a WSR apparatus and a servo-control assembly, according to the present invention.

FIG. 4A depicts a schematic illustration of a first embodiment of a WSR-S apparatus according to the present invention. The WSR-S apparatus 400 comprises a WSR apparatus 410 and a servo-control assembly 440. The WSR apparatus 410 may be substantially similar to the WSR apparatus 100 of FIG. 1A, or any other embodiment in accordance with the present invention. The servo-control assembly 440 includes a spectral power monitor 460, for monitoring the optical power levels of the spectral channels coupled into the output ports 420-1 through 420-N of the WSR apparatus 410. By way of example, the spectral power monitor 460 may be coupled to the output ports 420-1 through 420-N by way of fiber-optic couplers 420-1–C through 420-N–C, wherein each fiber-optic coupler serves to "tap off" a predetermined fraction of the optical signal in the corresponding output port. The servo-control assembly 440 further includes a processing unit 470, in communication with the spectral power monitor 460 and the channel micromirrors 430 of the WSR apparatus 410. The processing unit 470 uses the optical power measurements from the spectral power monitor 460 to provide feedback control of the channel micromirrors 430 on an individual basis, so as to maintain a desired coupling efficiency for each spectral channel into a selected output port.

By way of example, the processing unit 470 may apply an appropriate alternating (or "dither") control signal to a channel micromirror, in superposition with the dc control signal for maintaining the channel micromirror at a particular pivoting position. This enables both the optical power level of the corresponding spectral channel and the rate of change in the optical power level (or the time derivative of the optical power level) at the instant micromirror's pivoting angle to be obtained. In view of the exemplary coupling efficiency curve depicted in FIG. 1C, the rate of change in the optical power level is proportional to the slope of the coupling efficiency curve, and is therefore useful in locating the micromirror's pivoting angle corresponding to the measured optical power level. It is also useful in determining the magnitude of the feedback control signal to be applied to the channel micromirror, so as to achieve the desired coupling efficiency in a most effective manner. From the teachings of the present invention, a skilled artisan will know how to devise an appropriate servo control scheme, to best suit a given application.

As such, the servo-control assembly 440 provides dynamic control of the coupling of the spectral channels into the respective output ports on a channel-by-channel basis and thereby manages the optical power levels of the spectral channels coupled into the output ports. The optical power levels of the spectral channels in the output ports may be dynamically managed according to demand, or maintained at desired values (e.g., equalized at a predetermined value) in the present invention. Such a spectral power-management capability is essential in WDM optical networking applications, as discussed above.

Figure 4B:
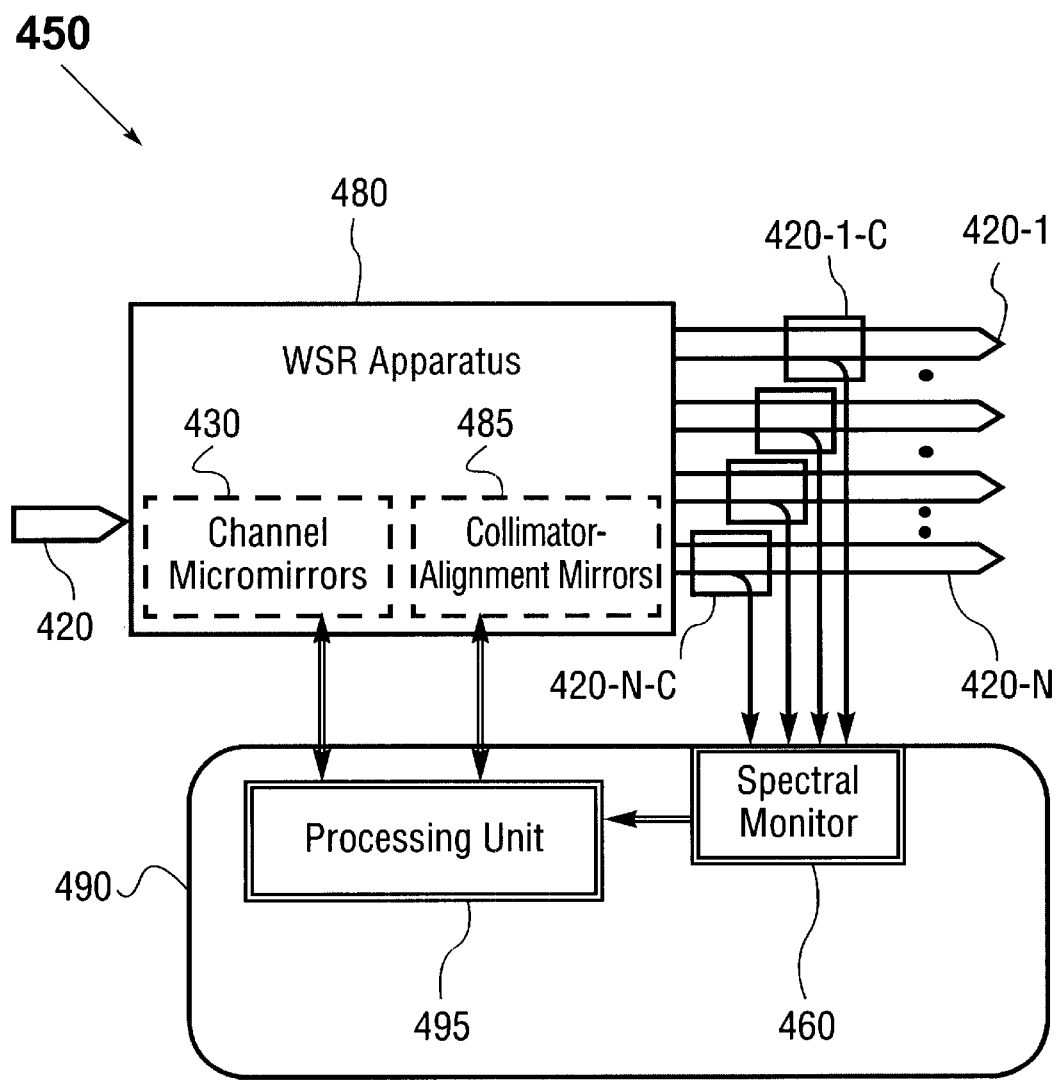

FIG. 4B depicts a schematic illustration of a second embodiment of a WSR-S apparatus according to the present invention. The WSR-S apparatus 450 comprises a WSR apparatus 480 and a servo-control assembly 490. In addition to the channel micromirrors 430 (and other elements identified by the same numerals as those used in FIG. 4A), the WSR apparatus 480 further includes a plurality of collimator-alignment mirrors 485, and may be configured according to the embodiment of FIG. 2A, 2B, 3, or any other embodiment in accordance with the present invention. By way of example, the servo-control assembly 490 includes the spectral power monitor 460 as described in the embodiment of FIG. 4A, and a processing unit 495. In this case, the processing unit 495 is in communication with the channel micromirrors 430 and the collimator-alignment mirrors 485 of the WSR apparatus 480, as well as the spectral power monitor 460. The processing unit 495 uses the optical power measurements from the spectral power monitor 460 to provide dynamic control of the channel micromirrors 430 along with the collimator-alignment mirrors 485, so as to maintain the coupling efficiencies of the spectral channels into the output ports at desired values. The underlying operating principle of the processing unit 495 may be substantially similar to that of processing unit 470, as described above.

In the embodiment of FIG. 4A or 4B, the spectral power monitor 460 may be one of spectral power monitoring devices known in the art that is capable of detecting the optical power levels of spectral components in a multi-wavelength optical signal. Such devices are typically in the form of a wavelength-separating means (e.g., a diffraction grating) that spatially separates a multi-wavelength optical signal by wavelength into constituent spectral components, and one or more optical sensors (e.g., an array of photodiodes) that are configured such to detect the optical power levels of these spectral components. The processing unit 470 in FIG. 4A (or the processing unit 495 in FIG. 4B) typically includes electrical circuits and signal processing programs for processing the optical power measurements received from the spectral power monitor 460 and generating appropriate control signals to be applied to the channel micromirrors 430 (and the collimator-alignment mirrors 485 in the case of FIG. 4B), so as to maintain the coupling efficiencies of the spectral channels into the output ports at desired values. The electronic circuitry and the associated signal processing algorithm/software for such a processing unit in a servo-control system are known in the art. Those skilled in the art will know how to implement a suitable spectral power monitor along with an appropriate processing unit to provide a servo-control assembly in a WSP-S apparatus according to the present invention, for a given application.

The incorporation of a servo-control assembly provides additional advantages of effectively relaxing the requisite fabrication tolerances and the precision of optical alignment during initial assembly of a WSR apparatus of the present invention, and further enabling the system to correct for shift in the alignment that may arise over the course of operation. By maintaining an optimal optical alignment, the optical losses incurred by the spectral channels are also significantly reduced. As such, the WSR-S apparatus thus constructed is simpler and more adaptable in structure, more robust in performance, and lower in cost and optical loss. Accordingly, the WSR-S (or WSR) apparatus of the present invention may be used to construct a variety of optical devices, including a novel class of optical add-drop multiplexers (OADMs) for WDM optical networking applications.

Figure 5A:
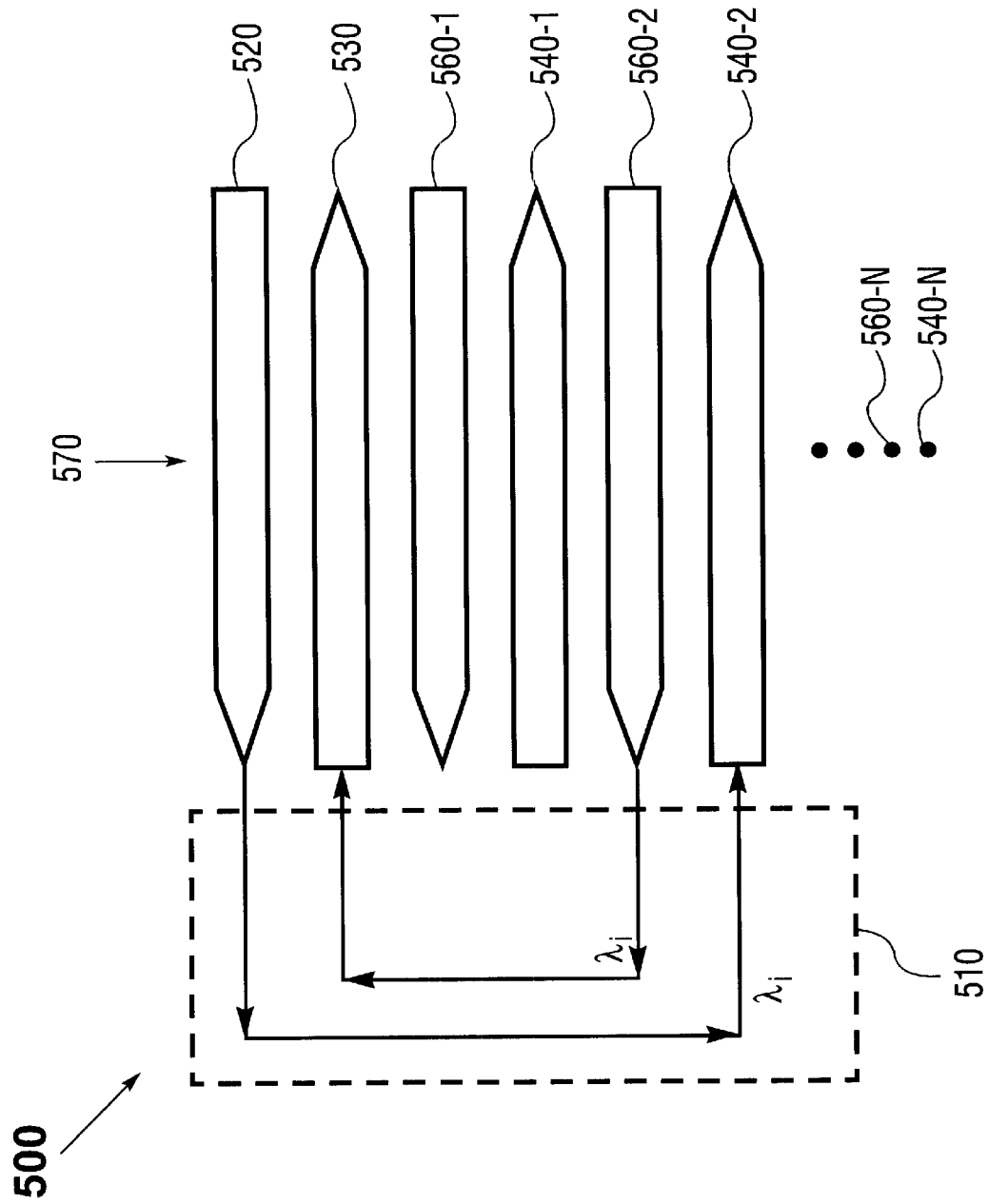
FIGS. 5A–5B depicts a first embodiment of an optical add-drop multiplexer (OADM) according to the present invention.
Figure 5B:
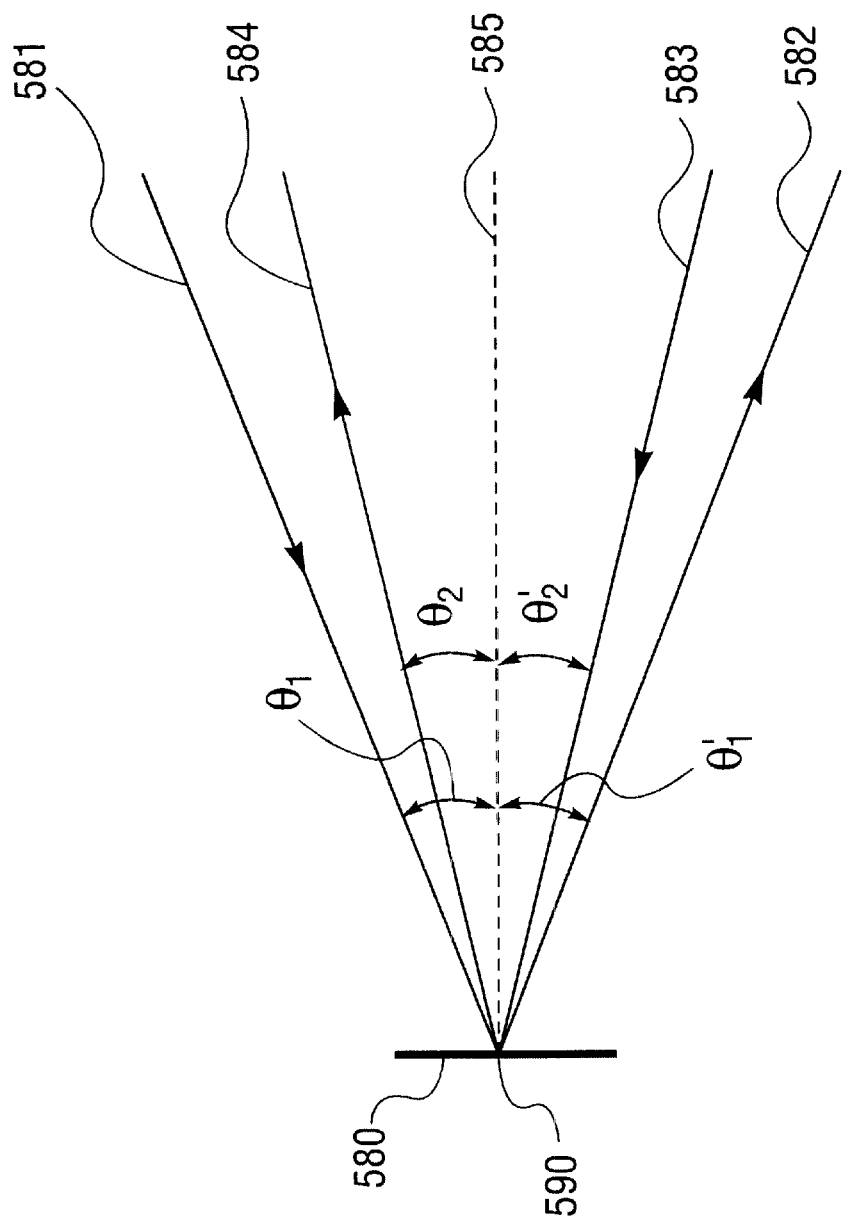

FIGS. 5A–5B depict a first embodiment of an optical add-drop multiplexer (OADM) of the present invention.

Shown in FIG. 5A is a schematic view of OADM 500 according to the present invention, which only illustrates the input and output ports of a WSR apparatus, along with a plurality of add ports. The remainder of the WSR apparatus is schematically represented by a dashed box 510, for purpose of simplicity and clarity. The WSR apparatus in this case may be constructed according to the embodiment of FIG. 1A, 2A, 2B, 3, or any other configuration in accordance with the present invention. By way of example, an input port 520, a pass-through port 530, and a plurality of drop ports 540-1 through 540-N may be arranged, along with a plurality of add ports 560-1 through 560-N, in a one-dimensional input-output-port array 570. The arrangement of the input-output-port array 570 may be such that the input ports (e.g., the input port 520 and the add ports) transmitting the incoming optical signals and the output ports (e.g., the pass-through 530 and the drop ports) carrying the outgoing optical signals are positioned in an alternating (or interleaved) fashion, whereby interposed between every two input ports is an output port, and vice versa. Such an arrangement warrants that if a spectral channel $\lambda_i$ originating from the input port 520 is to be routed to a drop port, such as the drop port 540-2, by way of the optical system in the dashed box 510, an add spectral channel with the same wavelength $\lambda_i$ emerging from an adjacent add port 560-2 can be directed into the pass-through port 530 by the same optical system in the dashed box 510. This is due to the fact that the drop spectral channel and the corresponding add spectral channel are routed to their respective destinations by the same channel micromirror in the dashed box 510, as to be shown in further detail in FIG. 5B. (Note: in view of the functionality thus described, the add port 560-2 is intrinsically paired with the drop port 540-2; likewise, the add port 560-i is paired with the drop port 540-i, where i=1 through N.)

By way of example, FIG. 5B depicts an exemplary channel micromirror 580 (e.g., the channel micromirror 103-i shown in FIG. 1B) in a magnified schematic view. A first incident beam 581 represents the spectral channel $\lambda_i$ originating from the input port 520 in FIG. 5A, and a first reflected beam 582 represents the reflected spectral channel $\lambda_i$ from the channel micromirror 580. A second incident beam 583 represents the add spectral channel $\lambda_j$ coming from the add port 560-2 in FIG. 5A, and a second reflected beam 584 represents the reflected add channel $\lambda_i$ from the channel micromirror 580. Line 585 indicates the normal direction to the reflective surface of the channel micromirror 580. Because the angle of incidence $\theta_1$ for the first incident beam 581 is equal to the angle of reflection $\theta_1'$ for the first reflected beam 582, and the angle of incidence $\theta_2$ for the second incident beam 583 is likewise the same as the angle of reflection $\theta_2'$ for the second reflected beam 584, the spatial arrangement by which the input, pass-through, drop, and add ports are positioned in FIG. 5A enables the first reflected beam 582 to be routed into the drop port 540-2 and the second reflected beam 584 to be directed into the pass-through port 530.

Moreover, by undergoing pivoting (or rotational) motion, e.g., about an axis 590 (e.g., along the x-direction shown in FIG. 1B) perpendicular to the plane of the paper, the channel micromirror 580 is further able to direct the spectral channel $\lambda_i$ into any other drop port in the input-output-port array 570, along with routing an add spectral channel (with the same wavelength) from a pairing add port to the pass-through port 530, as governed by the same operation principle illustrated in FIG. 5B. The micromirror 580 may also direct the spectral channel $\lambda_i$ to the pass-through port 530, as described in the embodiment of FIG. 1A, 2A, 2B, or 3.

One skilled in the art will appreciate that the exemplary embodiment of FIG. 5B and the operation principle thus illustrated are applicable to any channel micromirror in the OADM 500. As such, the OADM 500 is capable of inserting (or "adding") add spectral channels from multiple add ports to the pass-through port 530, while simultaneously routing the spectral channels from the input port 520 into the appropriate drop ports, thereby performing both add and drop functions in a dynamically reconfigurable way.

It should be noted that the exemplary embodiment of FIG. 5A is provided, by way of example, to illustrate the general principles of the present invention. Various elements and features are shown for illustrative purpose only, and therefore not drawn to scale. For instance, the input, pass-through, drop and add ports in the input-output-port array 570 are generally not evenly spaced, although they may be approximately evenly spaced in a paraxial approximation. From the teachings of the present invention, those skilled in the art will also appreciate that there are many alternative ways of arranging the input ports and output ports in the input-output-port array 570 of FIG. 5A that would achieve substantially the same functionality as described above. By way of example, the input port 520 and the pass-through port 530 may be placed near the middle of, at the bottom of, or at any other desired location along the input-output-port array, so long as the drop ports and add ports are accordingly arranged so that interposed between every two input ports is an output port, and vice versa. This enables each channel micromirror to perform a dual function of "dropping" a spectral channel from the input port to a drop port and "adding" an add spectral channel (with the same wavelength) from a pairing add port to the pass-through port, in a manner as depicted in FIG. 5B. Furthermore, the input-output-port array 570 may be embodied by an array of fiber collimators, which may be conveniently mounted in a V-groove fabricated on a substrate made of silicon, plastic, or ceramic, as commonly practiced in the art.

Figure 6A:
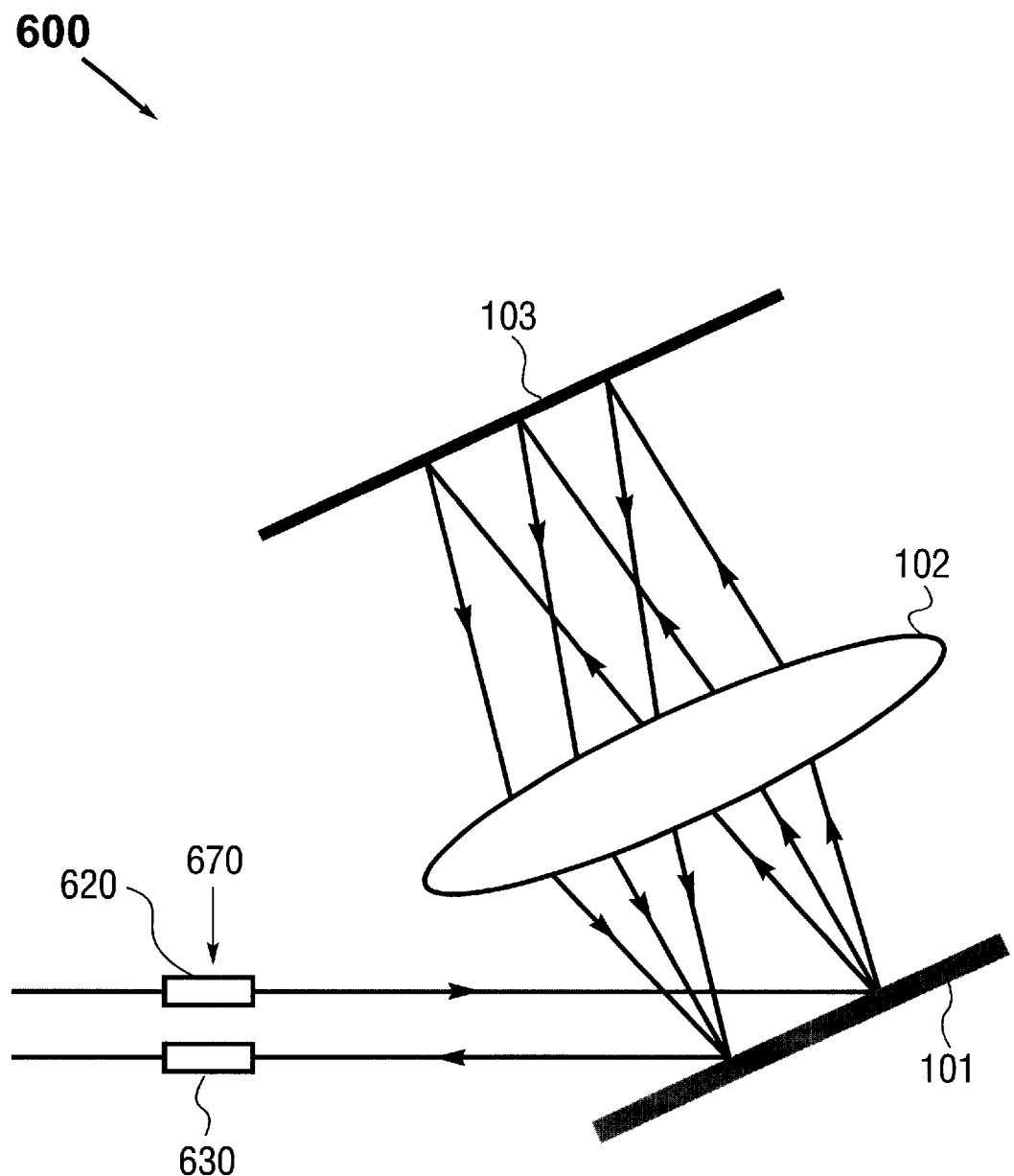
FIGS. 6A–6B shows a second embodiment of an OADM according to the present invention.
Figure 6B:
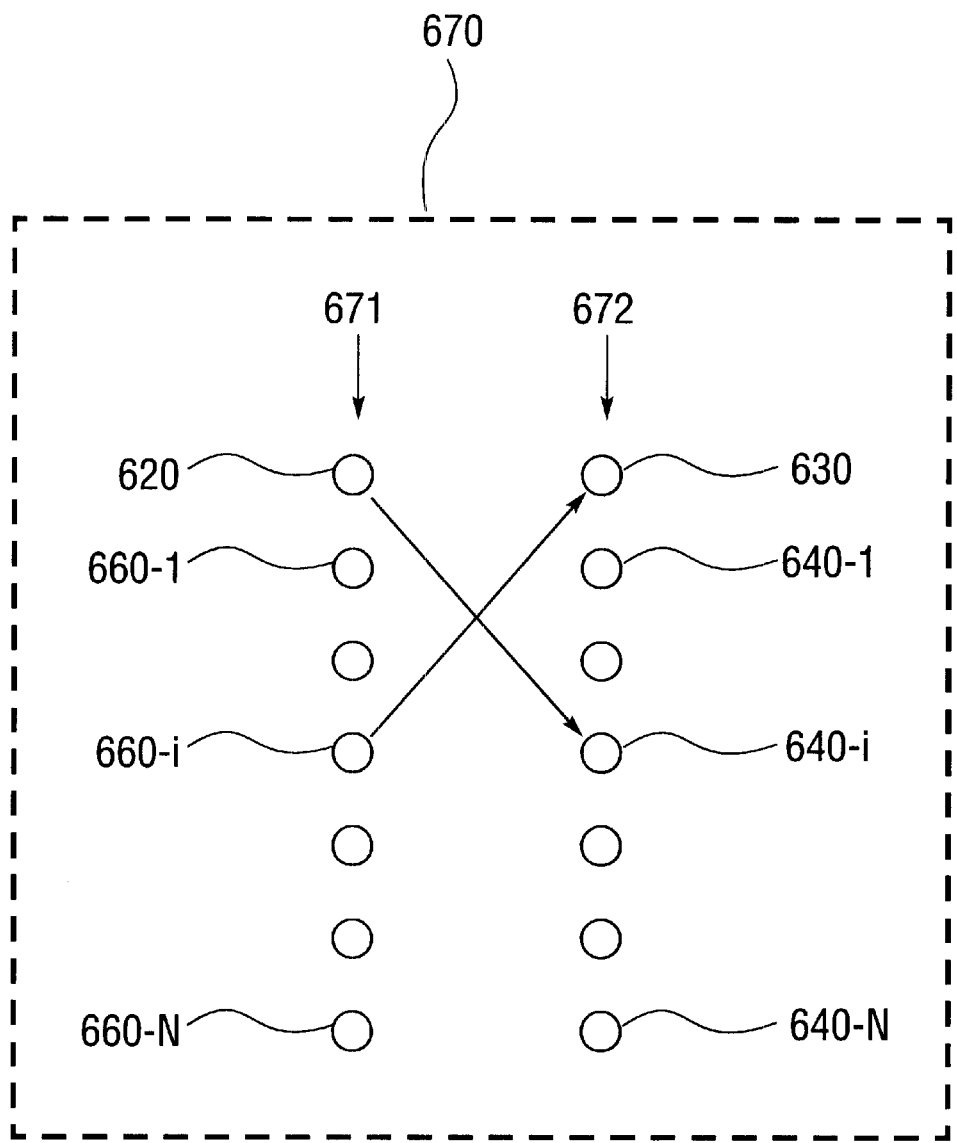

The underlying principle and operation of the embodiments of FIGS. 5A–5B may be readily extended to devise an OADM equipped with a two-dimensional array of input and output ports, as illustrated in FIGS. 6A–6B. Shown in FIG. 6A is a schematic top view of a second embodiment of an OADM according to the present invention. By way of example, the OADM 600 makes use of the general architecture of and hence a number of elements used in the embodiment of FIG. 1A, as identified by those elements labeled with identical numerals. In addition, a two-dimensional input-output-port array 670 is implemented (where only a top view of the input-output-port array 670 is explicitly shown), in lieu of the fiber collimator array 110 in FIG. 1A.

FIG. 6B depicts a schematic front view of the input-output-port array 670 of FIG. 6A. By way of example, the input-output-port array 670 comprises an input-port column 671 having an input port 620 and a plurality of add ports 660-1 through 660-N, and an output-port column 672 including a pass-through port 630 and a plurality of drop ports 640-1 through 640-N. In this arrangement, each input port (e.g., add port 660-i) forms a "pair" with its adjacent output port (e.g., drop port 640-i, where i=1 through N), in such a way to enable each channel micromirror to route a spectral channel from the input port 620 to a drop port (e.g., the drop port 640-i) and direct an add spectral channel (with the same wavelength) from a pairing add port (e.g., the add port 660-i) to the pass-through port 630, as the arrows in the figure indicate.

In operation, the input port 620 transmits a multi-wavelength optical signal. The wavelength-separator in the form of the diffraction grating 101 separates the multi-wavelength optical signal by wavelength respectively into multiple "incoming spectral channels". (Note: the "incoming spectral channels" herein refer to the spectral channels originating from the input port 620, in contrast with the add spectral channels to be described later). The beam-focuser in the form of the focusing lens 102 focuses the incoming spectral channels into corresponding focused spots, impinging onto the channel micromirrors 103. As a way of example, each channel micromirror may be configured such that in a "nominal position", it reflects the corresponding incoming spectral channel to the pass-through port 630, as illustrated in FIG. 6A. Furthermore, the diffraction grating 101, along with the focusing lens 102, may direct add spectral channels emerging from the add ports in the input-output-port array 670 onto corresponding ones of the channel micromirrors 103. By pivoting each channel micromirror about an appropriate axis (e.g., along the x-direction shown in FIG. 1B), the channel micromirror is further able to direct the incoming spectral channel into a drop port (e.g., the drop port 640-i) in the input-output-port array 670 and an impinging add spectral channel from a pairing add port (e.g., the add port 660-i) to the pass-through port 630, as illustrated in FIG. 6B.

One skilled in the art will recognize that the input-output-port array 670 may be alternatively implemented in any other WSR apparatus according to the present invention (e.g., by appropriately modifying the embodiment of FIG. 2A, 2B, or 3). Those skilled in the art will also appreciate that the exemplary embodiment of FIGS. 6A–6B is provided, by way of example, to illustrate the general principles of the present invention. Various elements and features are shown for illustrative purpose only, and therefore not drawn to scale. For instance, the input port 620 and the pass-through port 630 as a pair may be alternatively placed near the middle of, at the bottom of, or at any other desired location along the input-output-port array 670, so long as the input ports and the output ports are separately grouped in two columns and paired accordingly. The input-output-port array 670 may also be embodied by two columns of fiber collimators, wherein the input-port and output-port columns may be mounted in two V-grooves on a substrate, for example. From the teachings of the present invention, a skilled artisan will know how to implement various input and output ports in an OADM according to the present invention, to best suit a given application.

Furthermore, a two-dimensional array of collimator-alignment mirrors (along with first and second arrays of imaging lenses) may be additionally implemented between the input-output-port array 670 and the diffraction grating 101 in the embodiment of FIG. 6A (e.g., in a manner as illustrated in FIG. 3), such that each collimator-alignment mirror corresponds to either an input port or an output port. The collimator-alignment mirror array may be used for controlling the alignment of the multi-wavelength optical signal from the input port and the add spectral channels from the add ports, as well as for directing the reflected spectral channels into the output ports.

As such, a notable advantage of the aforementioned OADMs is the ability to perform both add and drop functions in a dynamically reconfigurable fashion, without involving additional components such as optical circulators and/or optical combiners.

Figure 7:
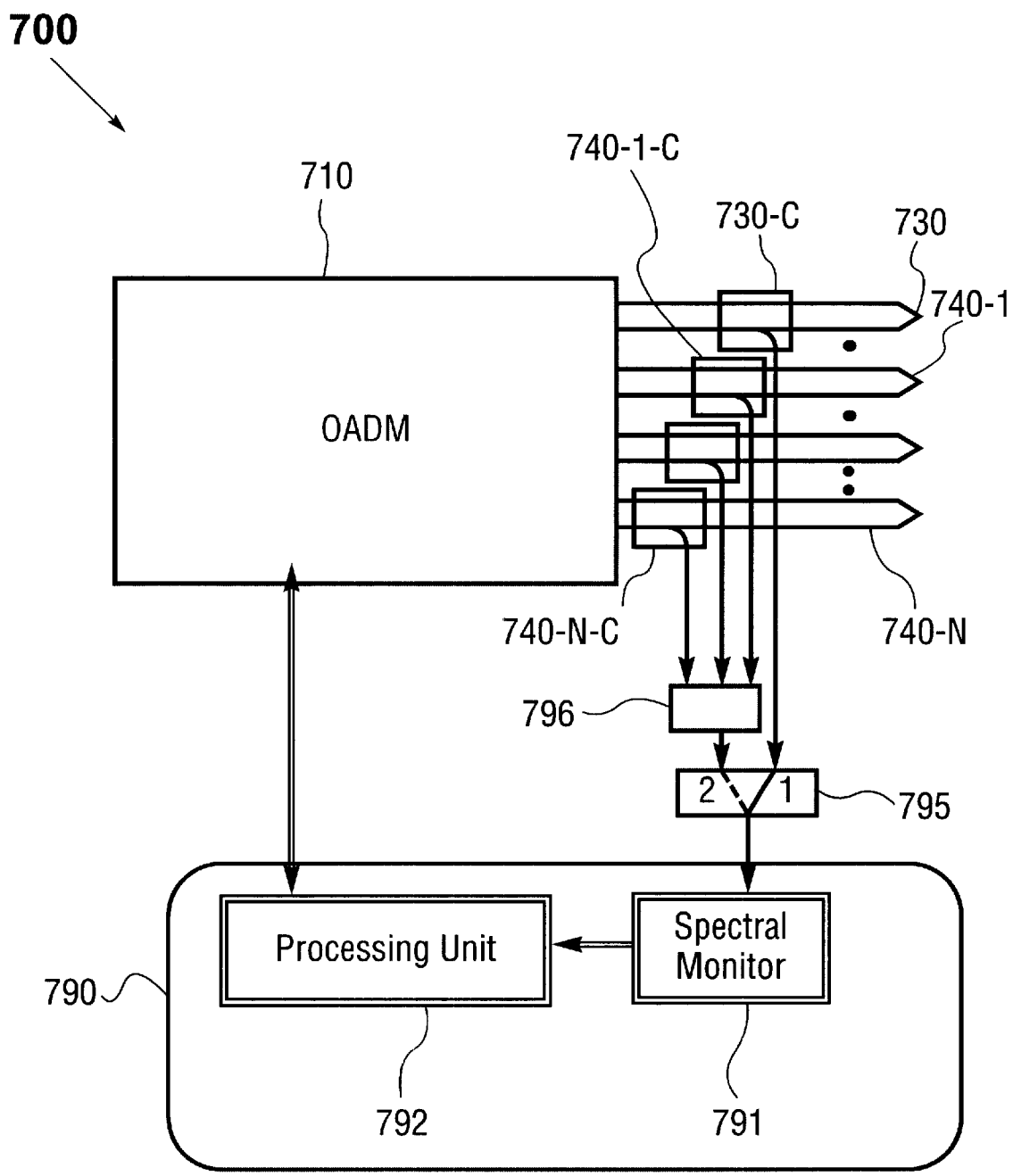
FIG. 7 shows an exemplary embodiment of an OADM employing a servo-control assembly, according to the present invention.

A servo-control assembly may be further incorporated in an OADM of the present invention, for monitoring and controlling the optical power levels of the spectral channels coupled into the output ports. By way of example, FIG. 7 depicts how a servo-control assembly 790 may be integrated in an OADM 710, according to the present invention. The OADM 710 may be substantially identical to the embodiment of FIG. 5A, 6A, or any other embodiment according to the present invention. For purpose of simplicity and clarity, only the output ports of the OADM 710 are explicitly shown, including a pass-through port 730 and a plurality of drop ports 740-1 through 740-N. (For example, these output ports may be the pass-through port 530 and the drop ports 540-1 through 540-N of FIG. 5A, or the constituents of the output-port column 672 in FIG. 6B). The servo-control assembly 790 may include a spectral power monitor 791 and a processing unit 792. The spectral power monitor 791 may be optically coupled to the pass-through port 730, so as to monitor the optical power levels of the spectral channels coupled into the pass-through port 730. The coupling of the spectral power monitor 791 to the pass-through port 730 may be accomplished by way of a fiber-optic coupler 730-C via an optical switch 795, for instance. The processing unit 792, in communication with the spectral power monitor 791 and the channel micromirrors in the OADM 710, uses the optical power measurements from the spectral power monitor 791 to provide feedback control of the channel micromirrors on an individual basis, so as to maintain the optical power levels of the spectral channels coupled into the pass-through port 730 at desired values. For example, the optical power levels of the spectral channels in the pass-through port 730 may be equalized at a predetermined value, as might be desired in an optical networking application. (Note: if the OADM 710 also includes the collimator-alignment mirrors as depicted in FIG. 2A, 2B, or 3, the processing unit 792 may additionally provide control of the collimator-alignment mirrors, in a manner as illustrated in FIG. 4B.)

In the embodiment of FIG. 7, the spectral power monitor 791 may additionally measure the optical power levels of the spectral channels in the drop ports 740-1 through 740-N, if so desired in a practical application. This may be accomplished by using fiber-optic couplers 740-1–C through 740-N–C to "tap off" predetermined fractions of the optical signals in the drop ports 740-1 through 740-N respectively. The tapped-off optical signals may be combined by an optical combiner 796, whose output may in turn be coupled to the optical switch 795. The configuration may be such that during normal operation, the optical switch 795 is set in a first switching state (1) that allows the optical signal diverted from the pass-through port 730 to pass into the spectral power monitor 791 (while blocking off the combined optical signal diverted from the drop ports), thereby enabling the optical power levels of the spectral channels in the pass-through port 730 to be monitored and further controlled (e.g., equalized). On an occasional or regular basis, the optical switch 795 may be set in a second switching state (2) that allows the combined optical signal tapped off from the drop ports to pass into the spectral power monitor 791 (while blocking off the optical signal diverted from the pass-through port 730), thereby allowing the optical power levels of the drop spectral channels to be measured. Note that the processing unit 792 need not provide feedback control of the channels micromirrors in the OADM 710, while the optical power levels of the drop spectral channels are being measured.

One skilled in the art will recognize that rather than operating the spectral power monitor 791 in a time-division-multiplexed fashion by way of the optical switch 795, an auxiliary spectral power monitor may be additionally employed in the embodiment of FIG. 7, dedicated for monitoring the optical power levels of the spectral channels in the drop ports. (The optical switch 795 need not be utilized, in this case.) In either scenario, the processing unit, the spectral power monitor(s) and the fiber-optic couplers of FIG. 7 may be substantially similar to those described in the embodiment of FIG. 4A (or 4B) in configuration and operation. The optical combiner 796 may be an N×1 fiber-optic coupler, or any other suitable optical combining means known in the art. The optical switch 795 may be a 2×1 switch. Those skilled in the art will appreciate that in lieu of the combination of the optical combiner 796 and the optical switch 795, an (N+1)×1 optical switch may be alternatively implemented in FIG. 7, where the (N+1) input ends of the switch may be coupled to the pass-through port 730 and the drop ports 740-1 through 740-N, respectively, and the output end of the switch may be coupled to the spectral power monitor 791.

It will be appreciated by one skilled in the art that the embodiments of FIGS. 5A and 6A provide only two of many embodiments of a dynamically reconfigurable OADM according to the present invention. Various changes, substitutions, and alternations can be made herein without departing from the principles and the scope of the invention as defined in the appended claims. Accordingly, a skilled artisan can design an OADM in accordance with the principles of the present invention, to best suit a given application.

Although the present invention and its advantages have been described in detail, the scope of the present invention should be determined by the following claims and their legal equivalents.

What is claimed is:

1. An optical apparatus comprising:
   a) a one-dimensional input-output-port array, providing multiple input ports including an input port for a multi-wavelength optical signal and a plurality of add ports, and multiple output ports including a pass-through port and a plurality of drop ports, wherein each drop port has a pairing add port;
   b) a wavelength-separator, for separating said multi-wavelength optical signal by wavelength respectively into incoming spectral channels;
   c) a beam-focuser, for focusing said incoming spectral channels into corresponding focused spots; and
   d) an array of channel micromirrors positioned such that each channel micromirror receives a unique one of said incoming spectral channels, said channel micromirrors being individually and continuously pivotable to reflect said incoming spectral channels into selected ones of said output ports;
   wherein said wavelength-separator and said beam-focuser further direct one or more add spectral channels from said add ports onto corresponding ones of said channel micromirrors, and wherein said input-output-port array is configured such that each channel micromirror is able to reflect an incoming spectral channel to a drop port and an impinging add spectral channel from a pairing add port to said pass-through port.

2. The optical apparatus of claim 1 further comprising a servo-control assembly, including a spectral power monitor for monitoring optical power levels of said reflected spectral channels in said pass-through port, and a processing unit responsive to said optical power levels for providing control of said channel micromirrors.

3. The optical apparatus of claim 2 wherein said optical power levels are maintained at a predetermined value.

4. The optical apparatus of claim 2 further comprising an optical switch having first and second switching states, whereby in said first switching state said spectral power monitor is in optical communication with said pass-through port, and in said second switching state said spectral power monitor is in optical communication with said drop ports.

5. The optical apparatus of claim 2 further comprising an auxiliary spectral power monitor, for measuring optical power levels of said reflected spectral channels coupled into said drop ports.

6. The optical apparatus of claim 1 further comprising an array of collimator-alignment mirrors, in optical communication with said wavelength-separator and said input-output-port array, for adjusting alignment of said multi-wavelength optical signal from said input port and said add spectral channels from said add ports, and for directing said reflected spectral channels into said output ports.

7. The optical apparatus of claim 6 further comprising first and second arrays of imaging lenses, in a telecentric arrangement with said collimator-alignment mirrors and said input-output-port array.

8. The optical apparatus of claim 6 wherein each collimator-alignment mirror is rotatable about at least one axis.

9. The optical apparatus of claim 1 wherein each channel micromirror is pivotable about at least one axis.

10. The optical apparatus of claim 1 wherein each channel micromirror is a silicon micromachined mirror.

11. The optical apparatus of claim 1 wherein said input-output-port array comprises alternating input and output ports.

12. The optical apparatus of claim 1 wherein said input-output-port array comprises fiber collimators.

13. The optical apparatus of claim 12 wherein said fiber collimators are mounted in a V-groove on a substrate.

14. The optical apparatus of claim 1 wherein said beam-focuser comprises a focusing lens, and wherein said wavelength-separator and said channel micromirrors are placed respectively in first and second focal planes of said focusing lens.

15. The optical apparatus of claim 1 wherein said wavelength-separator comprises an element selected from the group consisting of ruled diffraction gratings, holographic diffraction gratings, echelle gratings, curved diffraction gratings, transmission gratings, and dispersing prisms.

16. The optical apparatus of claim 1 further comprising a quarter-wave plate optically interposed between said wavelength-separator and said channel micromirrors.

17. The optical apparatus of claim 16 wherein said quarter-wave plate is optically interposed between said wavelength-separator and said beam-focuser.

18. The optical apparatus of claim 1 wherein said beam-focuser comprises an assembly of lenses.

19. An optical apparatus comprising:
   a) an input-output-port array, providing a plurality of input ports including an input port for a multi-wavelength optical signal and at least one add port, and a plurality of output ports including a pass-through port and at least one drop port, wherein each drop port has a pairing add port;
   b) a wavelength-separator, for separating said multi-wavelength optical signal by wavelength respectively into incoming spectral channels;
   c) a beam-focuser, for focusing said incoming spectral channels into corresponding focused spots;
   d) an array of channel micromirrors positioned such that each channel micromirror receives a unique one of said incoming spectral channels, said channel micromirrors being individually controllable to reflect said incoming spectral channels into selected ones of said output ports; and e) a servo-control assembly;

wherein said wavelength-separator and said beam-focuser further direct at least one add spectral channel from said at least one add port onto said channel micromirrors, wherein said input-output-port array is configured such that each channel micromirror is able to reflect an incoming spectral channel to a drop port and an impinging add spectral channel from a pairing add port to said pass-through port, and wherein said servo-control assembly maintains a predetermined coupling of each reflected spectral channel into said pass-through port.

20. The optical apparatus of claim 19 wherein said servo-control assembly includes a spectral power monitor for monitoring optical power levels of said reflected spectral channels coupled into said pass-through port, and a processing unit responsive to said optical power levels for providing control of said channel micromirrors.

21. The optical apparatus of claim 20 wherein said optical power levels are maintained at a predetermined value.

22. The optical apparatus of claim 19 further comprising an optical combiner coupled to said drop ports, and an optical switch coupled to said optical combiner, said pass-through port, and said spectral power monitor, whereby in a first switching state of said optical switch said spectral power monitor is in optical communication with said pass-through port, and in a second switching state of said optical switch said spectral power monitor is in optical communication with said drop ports via said optical combiner.

23. The optical apparatus of claim 19 further comprising an auxiliary spectral power monitor, for measuring optical power levels of said reflected spectral channels into said drop ports.

24. The optical apparatus of claim 19 further comprising an array of collimator-alignment mirrors, in optical communication with said wavelength-separator and said input-output-port array, for adjusting alignment of said multi-wavelength optical signal from said input port and said add spectral channels from said add ports, and for directing said reflected spectral channels into said output ports.

25. The optical apparatus of claim 24 further comprising first and second arrays of imaging lenses, in a telecentric arrangement with said collimator-alignment mirrors and said input-output-port array.

26. The optical apparatus of claim 24 wherein each collimator-alignment mirror is rotatable about at least one axis.

27. The optical apparatus of claim 19 wherein each channel micromirror is continuously pivotable about at least one axis.

28. The optical apparatus of claim 19 wherein each channel micromirror is a silicon micromachined mirror.

29. The optical apparatus of claim 19 wherein said input-output-port array is a one-dimensional array, having alternating input and output ports.

30. The optical apparatus of claim 19 wherein said input-output-port array is a two-dimensional array, configured such that said input ports and said output ports are separately grouped in two columns.

31. The optical apparatus of claim 19 wherein said input-output-port array comprises fiber collimators.

32. The optical apparatus of claim 19 wherein said beam-focuser comprises a focusing lens having first and second focal planes, and wherein said wavelength-separator and said channel micromirrors are placed respectively in said first and second focal planes.

33. The optical apparatus of claim 19 wherein said wavelength-separator comprises an element selected from the group consisting of ruled diffraction gratings, holographic diffraction gratings, echelle gratings, curved diffraction gratings, transmission gratings, and dispersing prisms.

34. The optical apparatus of claim 19 further comprising a quarter-wave plate optically interposed between said wavelength-separator and said channel micromirrors.

35. The optical apparatus of claim 19 wherein said beam-focuser comprises an assembly of lenses.

* * * * *